(12) United States Patent
Fisher-Jeffes et al.

(10) Patent No.: US 11,368,343 B2
(45) Date of Patent: Jun. 21, 2022

(54) RESERVING CHANNEL BY CYCLIC PREFIX EXTENSION FOR ALIGNMENT WITH SYMBOL BOUNDARY IN MOBILE COMMUNICATIONS

(71) Applicant: MediaTek Singapore Pte. Ltd., Singapore (SG)

(72) Inventors: Timothy Perrin Fisher-Jeffes, San Jose, CA (US); Chun-Hsuan Kuo, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 135 days.

(21) Appl. No.: 16/836,916

(22) Filed: Apr. 1, 2020

(65) Prior Publication Data

US 2020/0322198 A1 Oct. 8, 2020

Related U.S. Application Data

(60) Provisional application No. 62/828,553, filed on Apr. 3, 2019.

(51) Int. Cl.
| | | |
|---|---|---|
| *H04L 27/26* | (2006.01) | |
| *H04W 74/08* | (2009.01) | |
| *H04L 5/00* | (2006.01) | |
| *H04W 74/00* | (2009.01) | |
| *H04L 5/14* | (2006.01) | |

(52) U.S. Cl.
CPC ........ *H04L 27/2607* (2013.01); *H04L 5/0023* (2013.01); *H04L 5/14* (2013.01); *H04L 27/2678* (2013.01); *H04W 74/002* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2016/0127098 A1 | 5/2016 | Ng et al. | |
| 2018/0097679 A1* | 4/2018 | Zhang | H04W 72/1268 |
| 2018/0098342 A1* | 4/2018 | Jiang | H04L 27/2602 |
| 2019/0190687 A1* | 6/2019 | Yi | H04L 5/18 |
| 2020/0044796 A1* | 2/2020 | Yang | H04L 5/0092 |

(Continued)

FOREIGN PATENT DOCUMENTS

| | | |
|---|---|---|
| CN | 101022309 A | 8/2007 |
| CN | 101110634 A | 1/2008 |
| CN | 105721376 A | 6/2016 |

(Continued)

OTHER PUBLICATIONS

Taiwan Intellectual Property Office, Office Action for Taiwan Patent Application No. 109111171, dated Jan. 29, 2021.

(Continued)

*Primary Examiner* — Ajit Patel
(74) *Attorney, Agent, or Firm* — Han IP PLLC; Andy M. Han

(57) ABSTRACT

Examples pertaining to reserving channel by cyclic prefix (CP) extension for alignment with a symbol boundary in mobile communications are described. An apparatus extends a CP of a symbol to result in an extended symbol that aligns with a timing reference. The apparatus then transmits the extended symbol.

10 Claims, 5 Drawing Sheets

(56) References Cited

U.S. PATENT DOCUMENTS

2020/0169375 A1* 5/2020 Yi .......................... H04L 5/001
2020/0266959 A1* 8/2020 Yi ..................... H04W 74/0833

FOREIGN PATENT DOCUMENTS

EP          3301827 A1    4/2018
WO    WO 2012155680 A1    11/2012

OTHER PUBLICATIONS

Lenovo et al., DL Frame Structure and COT Aspects for NR-U, 3GPP TSG RAN WG1#96, R1-1902955, Athens, Greece, Feb. 25-Mar. 1, 2019.
Broadcom, Discussion on short fixed duration LBT for transmissions outside a COT, 3GPP TSG RAN WG1 Meeting #96, R1-1903370, Athens, Greece, Feb. 25-Mar. 1, 2019.
China National Intellectual Property Administration, International Search Report and Written Opinion tor PCT/CN2020/082679, dated Jun. 29, 2020.
Huawei et al., Coexistence and channel access or NR unlicensed band operations, 3GPP TSG RAN WG1 Meeting #96bis, R1-1903928, Xi'an, China, Apr. 8-12, 2019.
Intel Corporation, DL Signals and Channels for NR-unlicensed, 3GPP TSG RAN WG1 Meeting #96bis, R1-1904283, Xi'an, China, Apr. 8-14, 2019.

* cited by examiner

RESERVING CHANNEL BY CYCLIC PREFIX EXTENSION FOR ALIGNMENT WITH SYMBOL BOUNDARY IN MOBILE COMMUNICATIONS

CROSS REFERENCE TO RELATED PATENT APPLICATION(S)

The present disclosure is part of a non-provisional application claiming the priority benefit of U.S. Patent Application No. 62/828,553, filed on 3, Apr. 2019, the content of which being incorporated by reference in its entirety.

TECHNICAL FIELD

The present disclosure is generally related to mobile communications and, more particularly, to techniques pertaining to reserving channel by cyclic prefix (CP) extension for alignment with a symbol boundary in mobile communications.

BACKGROUND

Unless otherwise indicated herein, approaches described in this section are not prior art to the claims listed below and are not admitted as prior art by inclusion in this section.

In slot-based communication systems with timing gained from some timing reference, there tends to be an inherent desire to align with this timing reference. However, adaptivity procedures for shared unlicensed spectrum do not lend well to this behavior. That is, shared resources should be acquired as soon after they become available as a device, such as a user equipment (UE), is allowed within the pertinent regulatory framework. On the other hand, in case the device waits for a period of time before initiating an adaptivity procedure such that the end of the adaptivity procedure aligns with a symbol boundary, the device can be at a serious disadvantage with respect to other devices that do not wait as it is typically a competition among the devices where the fastest competitor wins a given resource. Certain incumbent technologies, such as Wi-Fi, do not align to a timing reference. Therefore, there is a need for a solution to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, techniques, methods and apparatuses to address the aforementioned issue. It is believed that the proposed schemes would improve the reception of the initial symbol. Additionally, it is believed that one or more the proposed schemes would block other competing devices from using the resource(s) won by a device implementing the proposed scheme(s) during its adaptivity procedure. Moreover, it is believed that the proposed schemes would allow the device to align to a desired timing reference.

In one aspect, a method may involve a processor of an apparatus extending a CP of a symbol to result in an extended symbol that aligns with a timing reference. The method may also involve the processor transmitting the extended symbol.

In another aspect, a method may involve a processor of an apparatus performing an adaptivity procedure with a network. The method may also involve the processor extending a CP of a symbol to result in an extended symbol that aligns with a timing reference. The method may further involve the processor transmitting the extended symbol. The method may additionally involve the processor performing an uplink (UL) transmission or a downlink (DL) transmission during a channel occupancy time (COT) after transmitting the extended symbol.

In yet another aspect, an apparatus may include a transceiver and a processor coupled to the transceiver. The transceiver may be configured to communicate with a network. The processor may be configured to extend a CP of a symbol to result in an extended symbol that aligns with a timing reference. The processor may be also configured to transmit the extended symbol.

It is noteworthy that, although description provided herein may be in the context of certain radio access technologies, networks and network topologies such as $5^{th}$ Generation (5G)/New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial Internet-of-Things (IoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reserving channel by CP extension for alignment with a symbol boundary in mobile communications. According to the present disclosure, a number of possible solutions may be implemented separately or jointly. That is, although these possible solutions may be described below separately, two or more of these possible solutions may be implemented in one combination or another.

Figure 1:
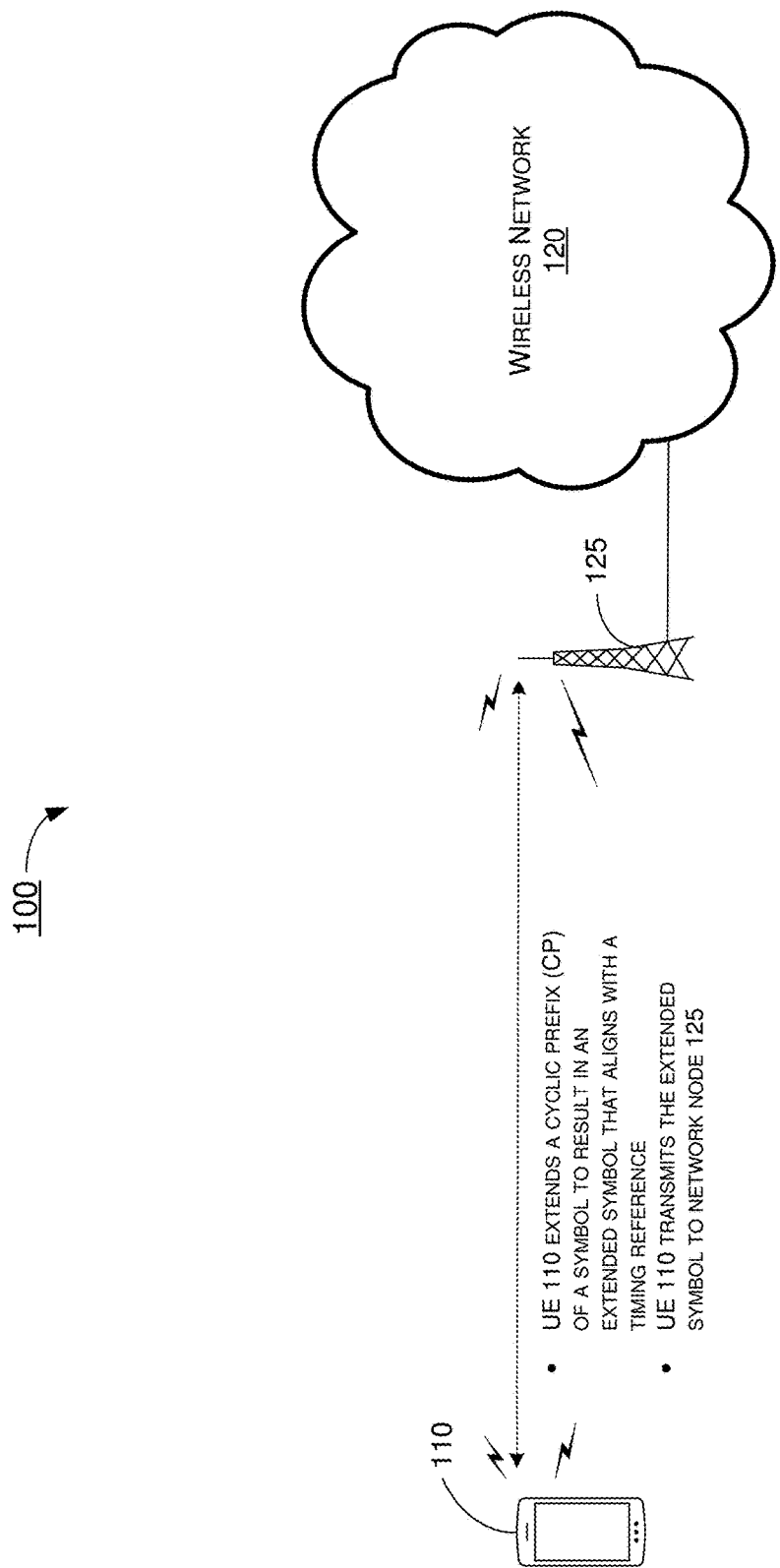
FIG. 1 is a diagram of an example network environment in which various solutions and schemes in accordance with the present disclosure may be implemented.
Figure 2:
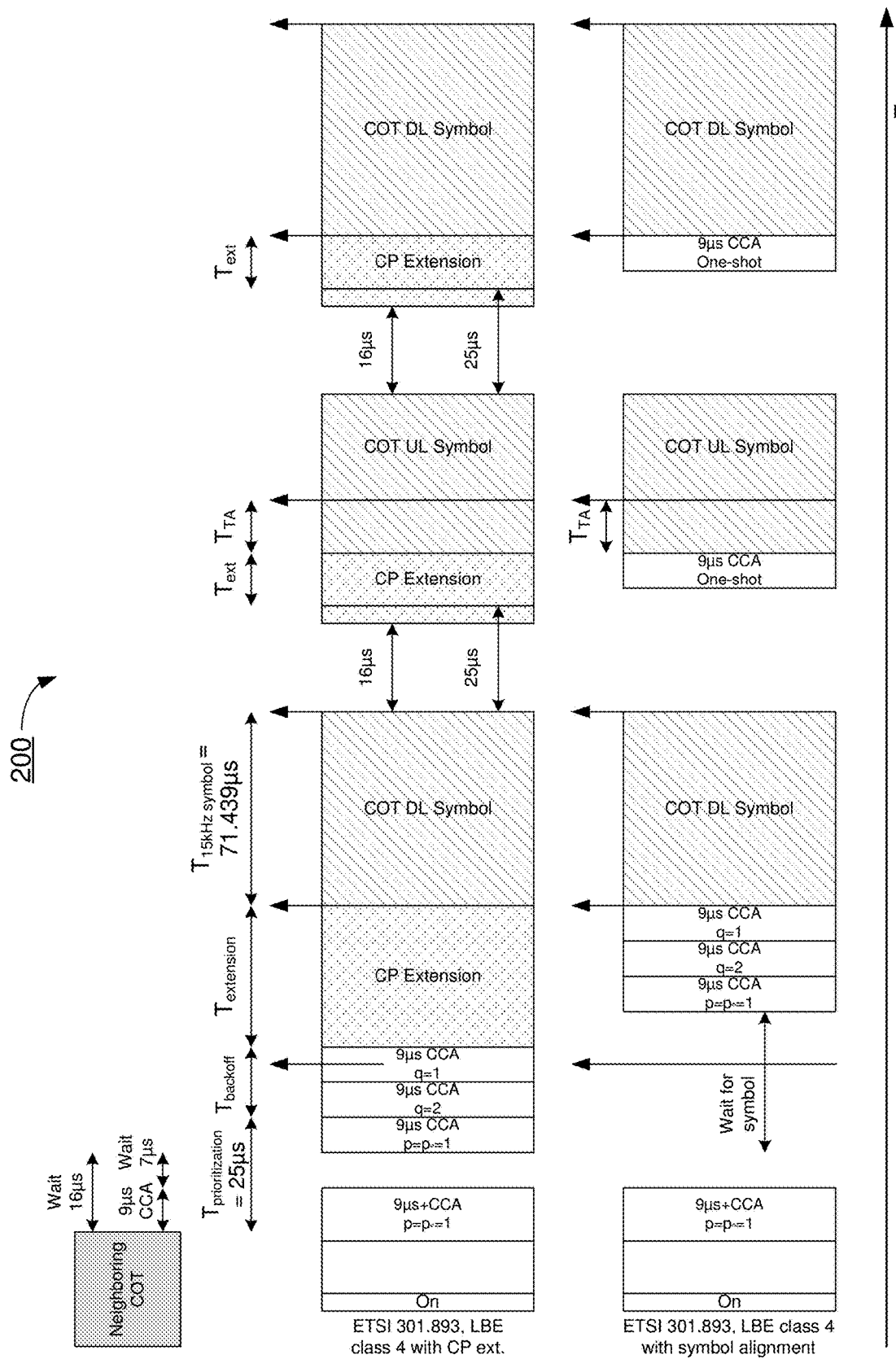
FIG. 2 shows an example scenario in accordance with an implementation of the present disclosure.

FIG. 1 illustrates an example network environment 100 in which various solutions and schemes in accordance with the present disclosure may be implemented. FIG. 2 illustrates an example scenario 200 of CP extension in accordance with an implementation of the present disclosure. Scenario 200 may be implemented in network environment 100. The following description of various proposed schemes is provided with reference to FIG. 1 and FIG. 2.

Referring to FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)) in a time-division duplexing (TDD) system in which UE 110 may operate in either a transmit mode or a receive mode and switch between the transmit mode and the receive mode. In network environment 100, UE 110 and wireless network 120 may implement various schemes pertaining to reserving channel by CP extension for alignment with a symbol boundary in mobile communications in accordance with the present disclosure, as described herein.

Communication systems in compliance with the 3$^{rd}$ Generation Partnership Project (3GPP) specification(s) are slot-based systems with reference timing dictated by the timing of a base station (e.g., gNB). However, gNB timing is not flexibly adjusted, and this means gNB timing is synchronous and all devices (e.g., UEs) would need to communicate with the gNB synchronously or at least near-synchronously. The term "unlicensed spectrum" refers to a shared resource used by any system at any time. This implies such shared resource is inherently asynchronous. Accordingly, competing devices conforming to Institute of Electrical and Electronics Engineers (IEEE) 802.11 specification(s) would be completely asynchronous. Shared spectrum can thus become free at any moment in time, completely unrelated to the timing of any gNB symbol. As such, a device (e.g., UE 110) waiting for alignment in time while competing for a shared resource would be at a distinct disadvantage in the competition for the shared resource, likely resulting in poor spectrum allocation to such device. Under an existing approach, a license-assisted access (LAA) device is to reserve a channel by immediately transmitting dummy payload or useless information until a desired timing boundary is reached before switching over to transmitting useful information. However, such approach tends to be wasteful and thus undesired. With respect to European Telecommunications Standards Institute (ETSI) load-based equipment (LBE) adaptivity with CP extension versus ETSI LBE adaptivity with waiting for symbol alignment, waiting is not the incumbent approach and would not result in ideal spectrum allocation. As for 3GPP LAA, resource is reserved by transmitting dummy loads/useless information with multiple symbols, which is undesirable. Under the IEEE 802.11 specifications for Wi-Fi, there is no alignment to any timing reference.

Under a proposed scheme in accordance with the present disclosure, UE 110 may transmit a useful signal (e.g., a signal with useful information), rather than dummy payload or useless information, which may in turn be utilized to better receive a subsequent symbol. For instance, extending a CP of the symbol may be one such useful signal that may reserve a channel and provide better protection in that UE 110 may be better able to receive the subsequent symbol.

Under the proposed scheme, CP extension may be used wherever a certain timing boundary is desired to be met as well as where idly waiting for the timing boundary would have undesired effect(s) on the ability of UE 110 to gain access to the channel. For instance, CP extension of a symbol may be performed by UE 110 at the start of a channel occupancy time (COT) where a transition of a radio of UE 110 is between asynchronous listen-before-talk (LBT) listening and transmitting (e.g., from asynchronous LBT listening to transmitting) at a specific time alignment of network node 125 or at a specific time alignment directed to UE 110 by network node 125. As another example, CP extension of the symbol may be performed by UE 110 at any transition in either direction between downlink (DL) transmission and uplink (UL) transmission (e.g., from DL transmission to UL transmission or from UL transmission to DL transmission) where a short gap is requisite to allowing the TDD system to turn around its radio between a transmit mode and a receive mode (e.g., from transmit mode to receive mode or from receive mode to transmit mode).

Due to the timing defined by regulation of LBT, provide that there is no gap in transmission greater than or equal to 16 μs, the system that creates the gaps would not face competition from other competing devices and, hence, would not lose the channel to other devices. Moreover, it is believed that, with gaps not greater than 25 μs, UE 110 would merely face competition from a few high-priority devices with a 25% probability of losing the channel to those high-priority devices. Therefore, preferably gaps would be maintained at, or not greater than, 16 μs or 25 μs.

Under the proposed scheme, CP extension may be equally applied to transitions between DL and UL transmissions. In a TDD system, a gap in transmission for radio turnaround time may need to be created. Since the system is synchronous, a partial symbol may be wasted for each turnaround DL→UL (from DL to UL) or UL→DL (from UL to DL), or a whole symbol may be wasted for each turnaround sequence of DL→UL→DL or UL→DL→UL. Depending on the minimum turnaround time of the radio and the chosen subcarrier spacing (as higher spacing implies symbol(s) of a shorter time duration), CP extension may span multiple shorter symbols, as shown in FIG. 2.

Due to network node 125 or UE 110 turnaround times (which may very well be different durations, depending on their respective radio architectures), gaps of different durations may be required for different transitions. Even when time-of-arrival ($T_{TA}$) of UE 110 is accounted for, a gap may still be required to allow for radio turnaround. Thus, any CP extension may also need to account for UE time-of-arrival as depicted in FIG. 2.

Thus, under a proposed scheme in accordance with the present disclosure, after a successful adaptivity procedure is completed by UE 110, UE 110 may extend the CP of a first orthogonal frequency-division multiplexing (OFDM) symbol to result in an extended symbol to an extent that the extended symbol aligns with a desired timing reference such that UE 110 may commence transmission of the extended symbol as soon as the transmission is allowed by pertinent regulations. For instance, UE 110 may extend the symbol by a fraction thereof. The fraction of symbol extended would be less than 1.0 (e.g., may be almost 1.0). Moreover, under the proposed scheme, locations of symbol alignment may be at the start of transmission after winning a COT or at any switching point(s) within a COT between DL transmission and UL transmission in any direction (e.g., DL→UL or UL→DL).

Illustrative Implementations

Figure 3:
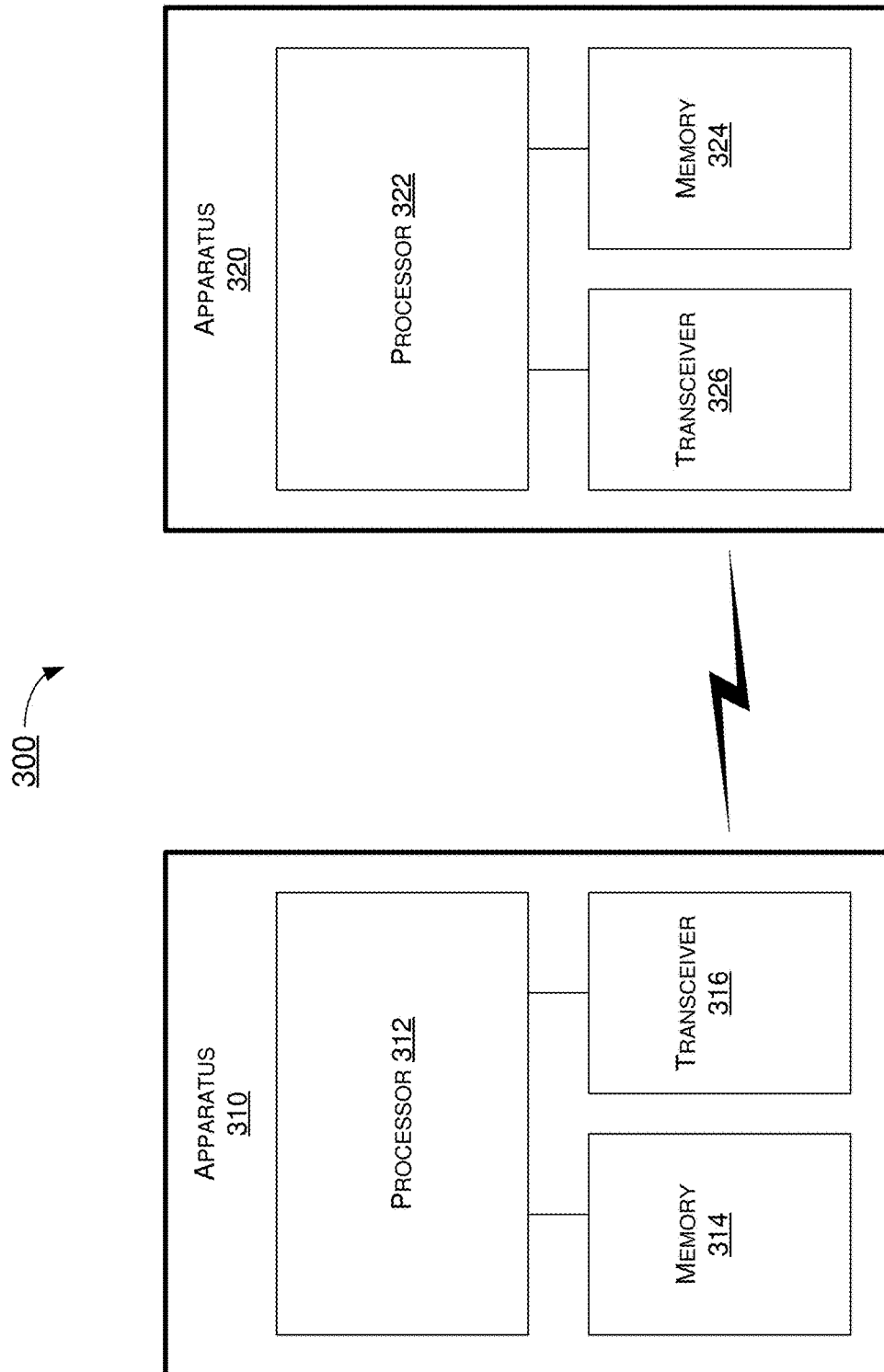
FIG. 3 is a block diagram of an example communication system in accordance with an implementation of the present disclosure.

FIG. 3 illustrates an example communication system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to reserving channel by CP extension for alignment with a symbol boundary in mobile communications, including the various schemes described above with respect to various proposed designs, concepts, schemes, systems and methods described above, including network environment 100, as well as processes described below.

Each of apparatus 310 and apparatus 320 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 310 and apparatus 320 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in an LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC or RISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to reserving channel by CP extension for alignment with a symbol boundary in mobile communications in accordance with various implementations of the present disclosure.

In some implementations, apparatus 310 may also include a transceiver 316 coupled to processor 312. Transceiver 316 may be capable of wirelessly transmitting and receiving data. In some implementations, transceiver 316 may be capable of wirelessly communicating with different types of wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for multiple-input multiple-output (MIMO) wireless communications. In some implementations, apparatus 320 may also include a transceiver 326 coupled to processor 322. Transceiver 326 may include a transceiver capable of wirelessly transmitting and receiving data. In some implementations, transceiver 326 may be capable of wirelessly communicating with different types of UEs/wireless networks of different RATs. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein.

Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 310 and apparatus 320 may be a communication entity capable of communicating with each other using various proposed schemes in accordance with the present disclosure. For illustrative purposes and without limitation, a description of capabilities of apparatus 310, as a UE (e.g., UE 110), and apparatus 320, as a network node (e.g., network node 125) of a wireless network (e.g., wireless network 120 as a 5G/NR mobile network), is provided below.

In one aspect of reserving channel by CP extension for alignment with a symbol boundary in mobile communications in accordance with the present disclosure, processor 312 of apparatus 310 may extend a CP of a symbol to result in an extended symbol that aligns with a timing reference. Moreover, processor 312 may transmit, via transceiver 316, to apparatus 320 the extended symbol.

In some implementations, in extending the CP of the symbol, processor 312 may extend the CP of the symbol by a fraction of a duration of the symbol with the fraction being less than 1.0.

Alternatively, or additionally, in extending the CP of the symbol, processor 312 may extend the CP of the symbol after completion of an adaptivity procedure.

Alternatively, or additionally, in extending the CP of the symbol, processor 312 may extend the CP of the symbol at a start of a COT where a transition between asynchronous LBT listening and transmission at a specific time alignment of a network or directed by the network.

In some implementations, in extending the CP of the symbol, processor 312 may extend the CP of the symbol at a transition from a DL transmission to an UL transmission with a gap allowing radio switching between a transmit mode and a receive mode in a TDD system. In such cases, the gap may be no greater than 25 µs (e.g., no greater than 16 µs).

Alternatively, in extending the CP of the symbol processor 312 may extend the CP of the symbol at a transition from an UL transmission to a DL transmission with a gap allowing radio switching between a transmit mode and a receive mode in a TDD system. In such cases, the gap may be no greater than 25 µs (e.g., no greater than 16 µs).

In some implementations, the extended symbol may align with the timing reference at a start of transmission after the apparatus acquiring a COT.

In some implementations, the extended symbol may align with the timing reference at a switching point within a COT from a DL transmission to an UL transmission. Alternatively, the extended symbol may align with the timing reference at a switching point within a COT from an UL transmission to a DL transmission.

In another aspect of reserving channel by CP extension for alignment with a symbol boundary in mobile communications in accordance with the present disclosure, processor 312 of apparatus 310 may perform, via transceiver 316, an adaptivity procedure with a network (e.g., wireless network 120) via apparatus 320 (e.g., as network node 125). Additionally, processor 312 may extend a CP of a symbol to result in an extended symbol that aligns with a timing reference. Moreover, processor 312 may transmit, via transceiver 316, the extended symbol (e.g., to apparatus 320). Furthermore, processor 312 may perform, via transceiver 316, an UL transmission or a DL transmission during a COT after transmitting the extended symbol.

In some implementations, in extending of the CP of the symbol, processor 312 may perform certain operations. For instance, processor 312 may extend the CP of the symbol by a fraction of a duration of the symbol with the fraction being less than 1.0. Alternatively, processor 312 may extend the CP of the symbol at a start of the COT where a transition between asynchronous LBT listening and transmission at a specific time alignment of the network or directed by the network.

In some implementations, in extending of the CP of the symbol, processor 312 may perform other operations. For instance, processor 312 may extend the CP of the symbol at a transition from the DL transmission to the UL transmission with a gap allowing radio switching between a transmit mode and a receive mode in a TDD system. Alternatively, processor 312 may extend the CP of the symbol at a transition from the UL transmission to the DL transmission with a gap allowing radio switching between the transmit mode and the receive mode in the TDD system.

Illustrative Processes

Figure 4:
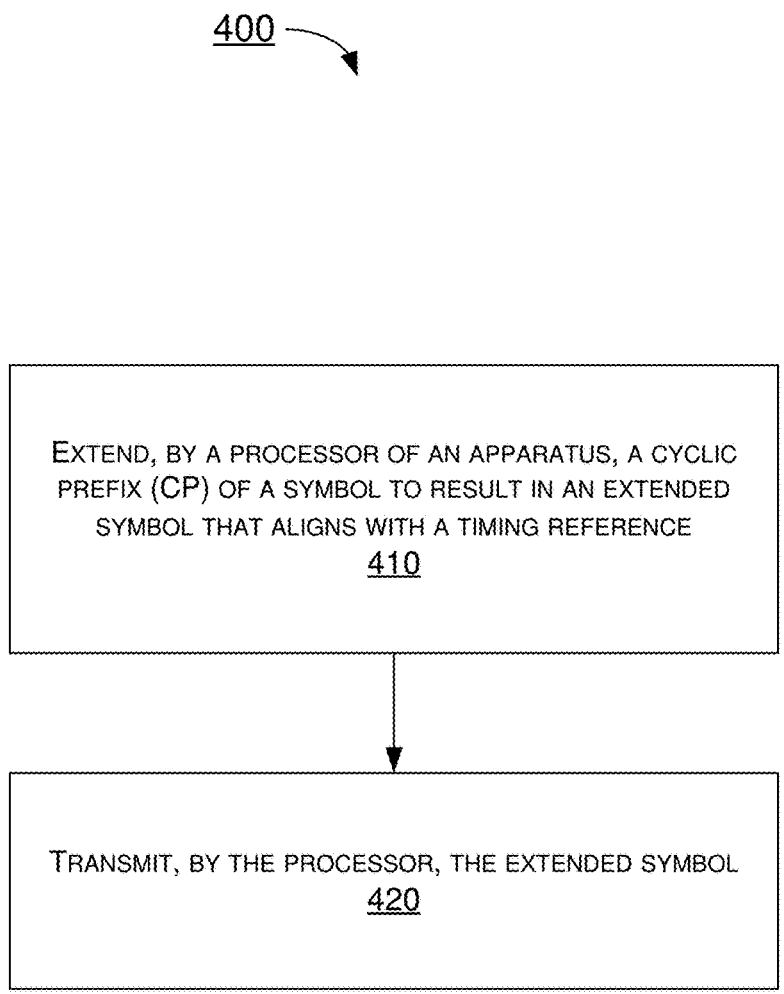
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to FIG. 1~FIG. 3. More specifically, process 400 may represent an aspect of the proposed concepts and schemes pertaining to reserving channel by CP extension for alignment with a symbol boundary in mobile communications. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 310 and apparatus 320 as well as any variations thereof. Solely for illustrative purposes and without limiting the scope, process 400 is described below in the context of apparatus 310 as a UE (e.g., UE 110) and apparatus 320 as a communication entity such as a network node or base station (e.g., network node 125) of a wireless network (e.g., wireless network 120). Process 400 may begin at block 410.

At 410, process 400 may involve processor 312 of apparatus 310 (e.g., as UE 110) extending a CP of a symbol to result in an extended symbol that aligns with a timing reference. Process 400 may proceed from 410 to 420.

At 420, process 400 may involve processor 312 transmitting, via transceiver 316, to apparatus 320 (e.g., as network node 125) the extended symbol.

In some implementations, in extending the CP of the symbol, process 400 may involve processor 312 extending the CP of the symbol by a fraction of a duration of the symbol with the fraction being less than 1.0.

Alternatively, or additionally, in extending the CP of the symbol, process 400 may involve processor 312 extending the CP of the symbol after completion of an adaptivity procedure.

Alternatively, or additionally, in extending the CP of the symbol, process 400 may involve processor 312 extending the CP of the symbol at a start of a COT where a transition between asynchronous LBT listening and transmission at a specific time alignment of a network or directed by the network.

In some implementations, in extending the CP of the symbol, process 400 may involve processor 312 extending the CP of the symbol at a transition from a DL transmission to an UL transmission with a gap allowing radio switching between a transmit mode and a receive mode in a TDD system. In such cases, the gap may be no greater than 25 µs (e.g., no greater than 16 µs).

Alternatively, in extending the CP of the symbol, process 400 may involve processor 312 extending the CP of the symbol at a transition from an UL transmission to a DL transmission with a gap allowing radio switching between a transmit mode and a receive mode in a TDD system. In such cases, the gap may be no greater than 25 µs (e.g., no greater than 16 µs).

In some implementations, the extended symbol may align with the timing reference at a start of transmission after the apparatus acquiring a COT.

In some implementations, the extended symbol may align with the timing reference at a switching point within a COT from a DL transmission to an UL transmission. Alternatively, the extended symbol may align with the timing reference at a switching point within a COT from an UL transmission to a DL transmission.

Figure 5:
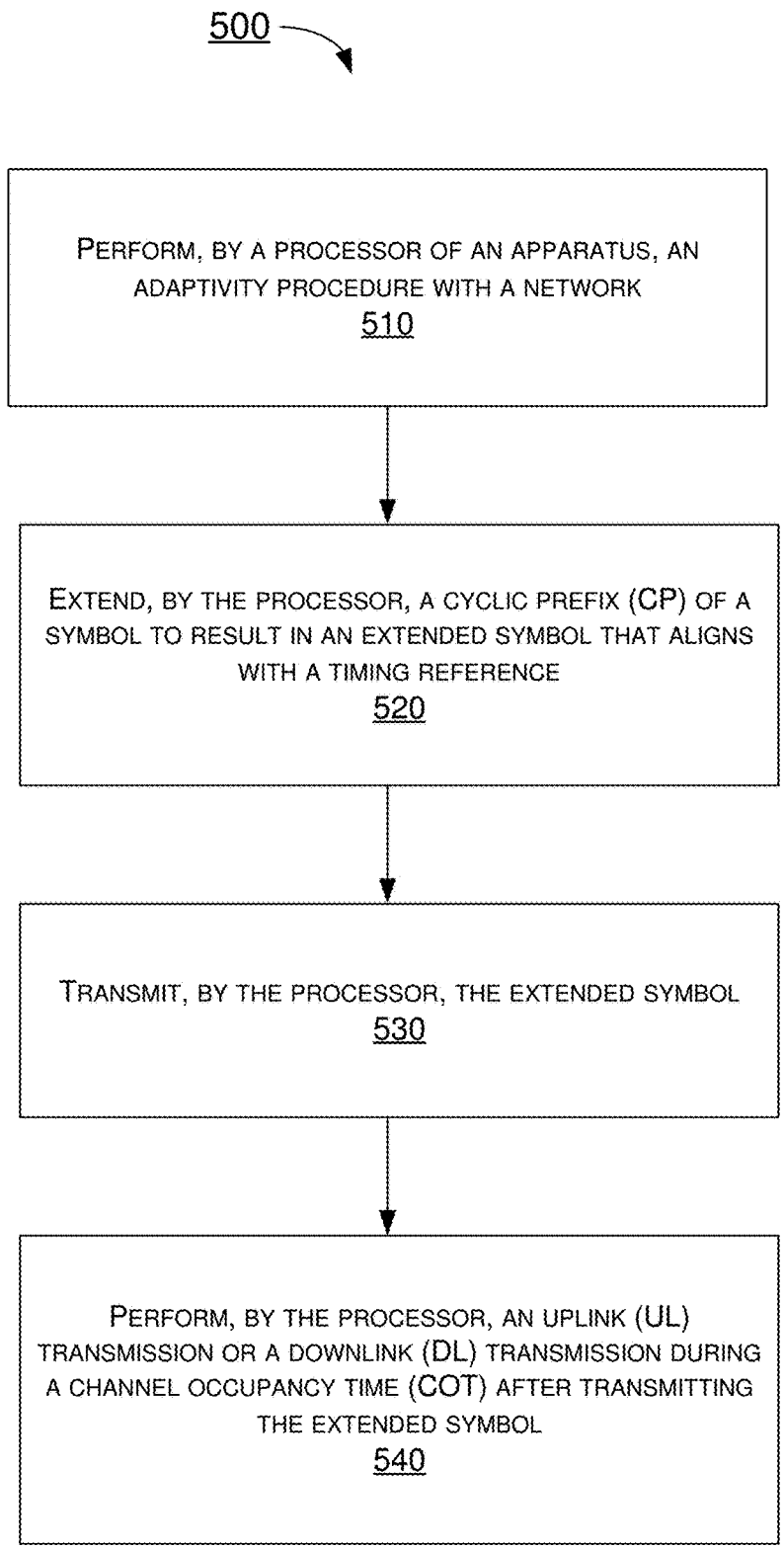
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1~FIG. 3. More specifically, process 500 may represent an aspect of the proposed concepts and schemes pertaining to reserving channel by CP extension for alignment with a symbol boundary in mobile communications. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 310 and apparatus 320 as well as any variations thereof. Solely for illustrative purposes and without limiting the scope, process 500 is described below in the context of apparatus 310 as a UE (e.g., UE 110) and apparatus 320 as a communication entity such as a network node or base station (e.g., network node 125) of a wireless network (e.g., wireless network 120). Process 500 may begin at block 510.

At 510, process 500 may involve processor 312 of apparatus 310 (e.g., as UE 110) performing, via transceiver 316, an adaptivity procedure with a network (e.g., wireless network 120) via apparatus 320 (e.g., as network node 125). Process 500 may proceed from 510 to 520.

At 520, process 500 may involve processor 312 extending a CP of a symbol to result in an extended symbol that aligns with a timing reference. Process 500 may proceed from 520 to 530.

At 530, process 500 may involve processor 312 transmitting, via transceiver 316, the extended symbol (e.g., to apparatus 320). Process 500 may proceed from 530 to 540.

At 540, process 500 may involve processor 312 performing, via transceiver 316, an UL transmission or a DL transmission during a COT after transmitting the extended symbol.

In some implementations, in extending of the CP of the symbol, process 500 may involve processor 312 performing certain operations. For instance, process 500 may involve processor 312 extending the CP of the symbol by a fraction of a duration of the symbol with the fraction being less than 1.0. Alternatively, process 500 may involve processor 312 extending the CP of the symbol at a start of the COT where a transition between asynchronous LBT listening and transmission at a specific time alignment of the network or directed by the network.

In some implementations, in extending of the CP of the symbol, process 500 may involve processor 312 performing other operations. For instance, process 500 may involve processor 312 extending the CP of the symbol at a transition from the DL transmission to the UL transmission with a gap allowing radio switching between a transmit mode and a receive mode in a TDD system. Alternatively, process 500 may involve processor 312 extending the CP of the symbol at a transition from the UL transmission to the DL transmission with a gap allowing radio switching between the transmit mode and the receive mode in the TDD system.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to,"

the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   extending, by a processor of an apparatus, a cyclic prefix (CP) of a symbol to result in an extended symbol that aligns with a timing reference; and
   transmitting, by the processor, the extended symbol,
   wherein the extending of the CP of the symbol comprises extending the CP of the symbol at a start of a channel occupancy time (COT) where a transition between asynchronous listen-before-talk (LBT) listening and transmission at a specific time alignment of a network or directed by the network.

2. The method of claim 1, wherein the extending of the CP of the symbol comprises extending the CP of the symbol by a fraction of a duration of the symbol with the fraction being less than 1.0.

3. The method of claim 1, wherein the extended symbol aligns with the timing reference at a start of transmission after the apparatus acquiring the COT.

4. The method of claim 1, wherein the extended symbol aligns with the timing reference at a switching point within the COT from a downlink (DL) transmission to an uplink (UL) transmission.

5. The method of claim 1, wherein the extended symbol aligns with the timing reference at a switching point within the COT from an uplink (UL) transmission to a downlink (DL) transmission.

6. A method, comprising:
   performing, by a processor of an apparatus, an adaptivity procedure with a network;
   extending, by the processor, a cyclic prefix (CP) of a symbol to result in an extended symbol that aligns with a timing reference;
   transmitting, by the processor, the extended symbol; and
   performing, by the processor, an uplink (UL) transmission or a downlink (DL) transmission during a channel occupancy time (COT) after transmitting the extended symbol,
   wherein the extending of the CP of the symbol comprises extending the CP of the symbol at a start of the COT where a transition between asynchronous listen-before-talk (LBT) listening and transmission at a specific time alignment of a network or directed by the network.

7. An apparatus, comprising:
   a transceiver configured to communicate with a network; and
   a processor coupled to the transceiver and configured to perform operations comprising:
      extending a cyclic prefix (CP) of a symbol to result in an extended symbol that aligns with a timing reference; and
      transmitting, via the transceiver, the extended symbol,
   wherein, in extending the CP of the symbol, the processor extends the CP of the symbol at a start of a channel occupancy time (COT) where a transition between asynchronous listen-before-talk (LBT) listening and transmission at a specific time alignment of a network or directed by the network.

8. The apparatus of claim 7, wherein, in extending the CP of the symbol, the processor either:
   extends the CP of the symbol by a fraction of a duration of the symbol with the fraction being less than 1.0.

9. The apparatus of claim 7, wherein the extended symbol aligns with the timing reference at a start of transmission after the apparatus acquiring the COT.

10. The apparatus of claim 7, wherein the extended symbol aligns with the timing reference at a switching point within the COT between a downlink (DL) transmission and an uplink (UL) transmission.

* * * * *